US006730762B2

(12) United States Patent
Lousenberg et al.

(10) Patent No.: US 6,730,762 B2
(45) Date of Patent: May 4, 2004

(54) LINEAR COPOLYMERS OF FLUOROCARBON-HYDROCARBON MONOMERS SYNTHESIZED IN CARBON DIOXIDE

(75) Inventors: Robert D. Lousenberg, Fayetteville, NC (US); Molly S. Shoichet, 15 Austin Crescent, Toronto (CA), M5R 3E4

(73) Assignees: Molly S. Shoichet, Toronto (CA); R. D. Lousenberg, Fayetteville, NC (US)

( * ) Notice: Subject to any disclaimer, the term of this patent is extended or adjusted under 35 U.S.C. 154(b) by 0 days.

(21) Appl. No.: 09/773,928

(22) Filed: Feb. 2, 2001

(65) Prior Publication Data

US 2001/0037007 A1 Nov. 1, 2001

Related U.S. Application Data

(60) Provisional application No. 60/179,728, filed on Feb. 2, 2000.

(51) Int. Cl.$^7$ ............................................. C08F 114/18
(52) U.S. Cl. ........................................ 526/250; 526/319
(58) Field of Search ............................... 526/250, 319

(56) References Cited

U.S. PATENT DOCUMENTS

| 5,506,317 A | 4/1996 | DeSimone et al. |
| 5,559,198 A | 9/1996 | Eian et al. |
| 5,618,894 A | 4/1997 | DeSimone et al. |
| 5,679,737 A | 10/1997 | DeSimone et al. |
| 5,739,223 A | 4/1998 | DeSimone |
| 5,780,553 A | 7/1998 | DeSimone et al. |
| 5,780,565 A | 7/1998 | Clough et al. |
| 5,824,726 A | 10/1998 | DeSimone et al. |
| 5,922,833 A | 7/1999 | DeSimone |
| 5,939,501 A | 8/1999 | DeSimone et al. |
| 5,981,673 A | 11/1999 | DeSimone et al. |

FOREIGN PATENT DOCUMENTS

| EP | 0911347 | 4/1999 |
| WO | 9623819 | 8/1996 |
| WO | 9834967 | 5/1998 |

OTHER PUBLICATIONS

DeSimone, J.M., Maury, E.E., Menceloglu, Y.Z., McClain J.B., Romack, T.J., Combes, J.R., *Science*, "Dispersion Polymerizations in Supercritical Carbon Dioxide", Jul. 15, 1994, vol. 265 pp. 356–358.

DeSimone, J.M., Guan,Zihibin, Elsbernd, C.S., *Science*, "Synthesis of Fluorpolymers in Supercritical Carbon Dioxide", Aug. 14, 1992, vol. 257, pp. 945–947.

*Primary Examiner*—Bernard Lipman
(74) *Attorney, Agent, or Firm*—Lynn C. Schumacher; Hill & Schumacher

(57) ABSTRACT

Linear copolymers of fluorocarbon and hydrocarbon monomers. The present invention provides linear copolymers and terpolymers of fluorocarbon and hydrocarbon monomers, and particularly the invention provides a linear copolymers, of fluoromonomers, such as tetrafluoroethylene, chlorotrifluoroethylene, or vinylidene fluoride, with hydrocarbon monomers, such as vinyl acetate, acrylic acid ethyl acetate or tertiary butyl acrylate. The copolymers were synthesized by polymerization by a free radical mechanism in supercritical carbon dioxide and they are linear because of synthesis in carbon dioxide. The copolymer composition was controlled by the monomer feed concentration to have between 7 and 71 mol % TFE. Additionally, new and predominantly linear co- and terpolymers were prepared by hydrolysis and trans-esterification of the latter copolymers. Furthermore, neither surfactants nor dispersing agents are required to produce the linear copolymers, but may be used.

23 Claims, 3 Drawing Sheets

LINEAR COPOLYMERS OF FLUOROCARBON-HYDROCARBON MONOMERS SYNTHESIZED IN CARBON DIOXIDE

CROSS REFERENCE TO RELATED UNITED STATES PATENT APPLICATION

This patent application relates to U.S. provisional patent application, Ser. No. 60/179,728, filed on Feb. 2, 2000, entitled LINEAR COPOLYMERS OF FLUOROCARBON-HYDROCARBON MONOMERS SYNTHESIZED IN CARBON DIOXIDE.

FIELD OF THE INVENTION

The present invention relates to linear copolymers of fluorocarbon-hydrocarbon monomers having desirable attributes of both monomers, and linear co- and terpolymers thereof, and a method of synthesis in liquid or supercritical carbon dioxide.

BACKGROUND OF THE INVENTION

Fluoropolymers have been used in a wide array of applications, including those in coatings (Jones, C. W. U.S. Pat. No. 5,723,556 1998), optical (Feiring, A. E.; Wonchoba, E. R. *Macromolecules* 1998 31, 7103–7104), and biomedical fields (Kogel, H.; Vollmar, J. F.; Proscheck, M. B.; Scharf, G.; Buftel, H. M. in *Prosthetic Substitution of Blood Vessels*, H. Kogel, Ed.; Quintessen-Verlags: Munchen, Germany, 1991, p. 143). However, the inherent thermal stability of commercially available fluoropolymers limits their processability while the inherent chemical stability limits their solubility in organic solvents. One approach to prepare a processable, organic solvent-soluble, functionalized fluoropolymer, is to copolymerize a fluorocarbon monomer, such as tetrafluoroethylene (TFE), with a hydrocarbon monomer, such as vinyl acetate (VAc).

Modena et al. (Modena, M.; Borsini, G.; Ragazzini, M.; *European Polymer J.* 1967 3, 5–12), U.S. Pat. Nos. 5,032,656 (Mares et al.) and 5,723,556 (Jones, C. W.) disclose copolymers of fluoromonomers, such as tetrafluoroethylene (TFE) and chlorotrifluoroethylene (CTFE), and functionalized hydrocarbon monomers, such as vinyl acetate (VAc). The copolymers were prepared by free radical polymerization in aqueous emulsions that may employ an organic co-solvent. The copolymers were amorphous, organic solvent soluble, and could be cast into colorless transparent films. Partial or complete hydrolysis of copolymers incorporating VAc, to vinyl alcohol (VA), yielded terpolymers and copolymers, respectively, with reactive functional sites for potential further modification, such as cross-linking. However, the solvent systems used for polymerization limited these copolymers. A narrow range of compositions was obtained when organic co-solvents were employed (U.S. Pat. No. 5,032,656) while highly branched structures were formed, for copolymers prepared in aqueous emulsions (U.S. Pat. No. 5,723,556).

Hydrolysis of the latter copolymers, prepared in aqueous emulsions, not only converted ester groups to the corresponding vinyl alcohol but also resulted in at least a 10-fold decrease in the weight average molar mass (Mw) of the copolymers. Furthermore, there was also a large decrease in intrinsic viscosity with hydrolysis (Modena et al. *European Polymer Journal* 1967). It was proposed that radical hydrogen abstraction, of methyl hydrogen from VAc by the macro-radical on TFE, and continued propagation of the resulting macro-radical, incorporated ester groups into the polymer backbone (U.S. Pat. No. 5,723,556). Subsequent hydrolysis cleaved these esters resulting in a decreased Mw.

DeSimone, J. M.; Guan, Z.; Elsbernd, C. S. *Science* 1992 257, 945–947, have shown that liquid or supercritical carbon dioxide ($CO_2$) is an environmentally friendly and convenient solvent for fluoropolymer synthesis. U.S. Pat. No. 5,618,894 (DeSimone, J. M. and Romack, T.) discloses a process for preparing homo- and copolymers of fluorocarbon monomers, and copolymers of fluorocarbon monomers with hydrocarbon monomers, such as ethylene in $CO_2$, but does not disclose linear copolymers. Furthermore, $CO_2$ was used for the dispersion homo- and copolymerization of VAc with other hydrocarbon monomers. Relatively high molar mass fluorocarbon-block-hydrocarbon copolymer surfactants were used to stabilize the polymer colloid as it formed (see Canelas, D. A.; Betts, D. E.; DeSimone, J. M.; Yates, M. Z.; Johnston, K. P. *Macromolecules* 1998 31, 6794–6805) since most polymers have limited or negligible solubility in $CO_2$. Exceptions include amorphous fluoropolymers and some poly(siloxanes) (DeSimone et al. *Chem. Rev.* 1999).

Surfactants may be used for a dispersion polymerization and are used for an emulsion polymerization in $CO_2$. In a dispersion polymerization, all components are initially soluble in the continuous $CO_2$ phase, whereas in an emulsion polymerization, both monomer and polymer are insoluble in the continuous phase. As the growing polymer chains in a dispersion polymerization reach a critical molar mass, the chains become insoluble and phase separate. At this point, surfactant molecules absorb to the colloid particle surface and prevent coagulation. Polymerization continues in both the continuous phase and the colloid polymer particles. The high molar mass, fluorocarbon-block-hydrocarbon copolymer surfactants and a low molar mass, commercially available, fluorocarbon-block-hydrocarbon oligomeric copolymer (Zonyl FSO-100™) were shown to form micelles in $CO_2$ (Fulton et al., DeSimone et al. *Langmuir* 1995). However, Zonyl FSO-100™ and similar materials, such as Fluorad™ FC-171 or FC-170C, have not previously been used as surfactants for polymerization in $CO_2$. Given that most small molecules have good solubility in $CO_2$, dispersion polymerizations constitute the majority of examples in the literature. However surfactants are not required for successful polymerizations in $CO_2$ of fluorocarbon-hydrocarbon copolymers.

DeSimone et al. *Polymer Preprints* 1997 also copolymerized TFE with perfluoropropylvinyl ether (PPVE) in $CO_2$. As a consequence of copolymerization in $CO_2$, the concentration of acid end-groups, resulting from undesirable β-scission chain transfer of PPVE, were at least 365 times lower than copolymers prepared in conventional solvents. The authors concluded that this was a consequence of propagation competing more effectively with β-scission resulting from $CO_2$'s proven invasive ability to facilitate diffusion of small molecules. This has been shown to be true, even of small molecules diffusing into crystalline fluoropolymer matrices (McCarthy et al. *Macromolecules* 1995). The rate of propagation, a bimolecular process, increased in the polymer phase. Since β-scission is a unimolecular process, changes in diffusion had little effect on its rate, and propagation relative to β-scission was more favorable in $CO_2$ than in conventional solvents.

It would be very advantageous to provide predominantly linear copolymers comprising fluorocarbon monomers and hydrocarbon monomers.

SUMMARY OF THE INVENTION

It is an object of the present invention to provide linear fluoropolymers, which are copolymers of fluorocarbon and hydrocarbon repeat units.

In one aspect of the invention there is provided a linear copolymer comprising fluorocarbon and hydrocarbon repeat units, with the fluorocarbon repeat unit being selected from the group consisting of tetrafluoroethylene, trifluoroethylene, chlorotrifluoroethylene, vinylidene fluoride, and vinyl fluoride and said hydrocarbon repeat unit being selected from the group consisting of vinyl acetate, vinyl alcohol, acrylic acid, acrylates and methacrylates.

The copolymers may contain a broad range of the fluorocarbon repeat units and are essentially linear. That is, there is a minimal decrease in molar mass and typically no decrease in viscosity upon hydrolysis, indicative of either no, or very low concentrations, of branches (such as esters) in the polymer backbone.

In another aspect of the present invention there is provided a linear copolymer comprising fluorocarbon monomers and hydrocarbon monomers, said fluorocarbon monomers having a formula $CF_2=CR1R2$, wherein C is carbon, F is fluorine, R1 is one of hydrogen, halogen, alkyl, aryl, haloalkyl, alkoxy, haloalkoxy, haloaryl and wherein R2 is one of hydrogen and halogen, said hydrocarbon monomers having a formula $CH_2=CR3CO_2R4$, wherein R3 is one of hydrogen and an alkyl, and R4 is one of hydrogen, an alkyl group and a haloalkyl group.

In a further aspect of the present invention there is provided a linear copolymer comprising fluorocarbon monomers and hydrocarbon monomers, fluorocarbon monomers having a formula, $CF_2=CR1R2$, wherein C is carbon, R1 is selected from the group consisting of hydrogen, halogen, alkyl, aryl, haloalkyl, alkoxy, haloalkoxy, haloaryl and R2 is selected from the group consisting of hydrogen, halogen, said hydrocarbon monomers having a formula, $CH_2=CR3OC(O)R4$ wherein R3 is one of hydrogen and alkyl, and R4 is an alkyl group.

In these two aspects of the invention linear copolymers or terpolymers may be produced by contacting the previously mentioned linear copolymers with a hydrolyzing or trans-esterification agent. Copolymers which contain a hydrocarbon monomer of the formula $CH_2=CR3OC(O)R4$, wherein R3 is H or alkyl and R4 is an alkyl group that may be partially or almost completely hydrolyzed to the vinyl alcohol, yielding terpolymers and copolymers, respectively. Copolymers which contain a hydrocarbon monomer of the formula $CH_2=CR3CO_2R4$, wherein R3 is H or alkyl, and R4 is an alkyl group may be trans-esterified to ester groups, $CO_2R5$, where R5 is a different group such as alkyl or haloalkyl. Additionally, R4 may be hydrolyzed to the carboxylic acid or salt.

The copolymer may be poly(tetrafluoroethylene-co-vinyl acetate) and hydrolysis of the VAc thereof, poly(chlorotrifluoroethylene-co-vinyl acetate) and hydrolysis of the VAc thereof, poly(vinylidene fluoride-co-vinyl acetate) and hydrolysis of the VAc thereof, poly(tetrafluoroethylene-co-acrylic acid) and esterification of the AA thereof, poly(tetrafluoroethylene-co-tertiary butyl acrylate) and transesterification of the tBA thereof.

The present invention also provides a method of synthesizing a linear copolymer comprising fluorocarbon and hydrocarbon repeat units, the method comprising mixing a fluorocarbon monomer, an initiator, an oligomeric nonionic surfactant, a hydrocarbon monomer and a polymerization medium comprising supercritical carbon dioxide and copolymerizing said fluorcarbon monomer and said hydrocarbon monomer.

In this aspect of the invention the mixture may contain an oligomeric nonionic surfactant having a $CO_2$ phobic portion and a $CO_2$ philic portion.

This invention provides a method of synthesizing linear terpolymers or copolymers, comprising;

providing a linear copolymer comprising fluorocarbon and hydrocarbon monomers;

hydrolyzing said linear copolymer in an effective acid medium; and collecting a linear copolymer or terpolymer produced by said acid hydrolysis.

There is also provided a method of synthesizing linear terpolymers or copolymers, comprising:

providing a linear copolymer comprising fluorocarbon and hydrocarbon monomers;

esterifying said linear copolymer in an effective acidic medium; and collecting a linear copolymer or terpolymer produced by said esterification.

There is also provided a method of synthesizing linear terpolymers or copolymers, comprising:

providing a linear copolymer comprising fluorocarbon and hydrocarbon monomers;

trans-esterifying said linear copolymer in an effective acidic medium; and collecting a linear copolymer or terpolymer produced by said trans-esterification.

BRIEF DESCRIPTION OF THE DRAWINGS

The method of synthesis of linear copolymers according to the present invention will now be described, by way of example only, reference being made to the accompanying drawings, in which.

DETAILED DESCRIPTION OF THE INVENTION

Herein, the inventors disclose linear copolymers comprising fluorocarbon and hydrocarbon repeat units.

The fluoromonomers that can be used to prepare linear fluoropolymers, which are copolymers of fluorocarbon and hydrocarbon monomers, include any suitable fluoromonomers known to those skilled in the art. Herein, fluoropolymers are defined as polymers, which contain a detectable quantity of at least one fluoromonomer. Useful fluoromonomers are those that are polymerizable by a free radical mechanism and include but are not limited to, tetrafluoroethylene (TFE), trifluoroethylene, chlorotrifluoroethylene (CTFE) and vinylidene fluoride ($VF_2$). Examples of functionalized hydrocarbon co-monomers that can be used in the present invention include any suitable hydrocarbon monomers known to those skilled in the art that may otherwise yield branched copolymers if not for copolymerization in carbon dioxide. Useful hydrocarbon monomers are those that are polymerizable by a free radical mechanism and include but are not limited to, vinyl acetate, vinyl propionate, tertiary butyl acrylate, tertiary butyl methacrylate, acrylic acid, acrylates, and methacrylates. Several hydrocarbon monomers, notably acrylates and acrylic acid, have high intrinsic reactivities with themselves and with other reactive monomers. Typically, they tend to react with themselves rather than with the other fluorocarbon co-monomer, and lack a physical affinity for domains of the other monomer. The copolymerization medium of the present invention consists essentially of liquid or preferably supercritical carbon dioxide, a polymerization initiator, and may contain a surfactant.

Figure 3:
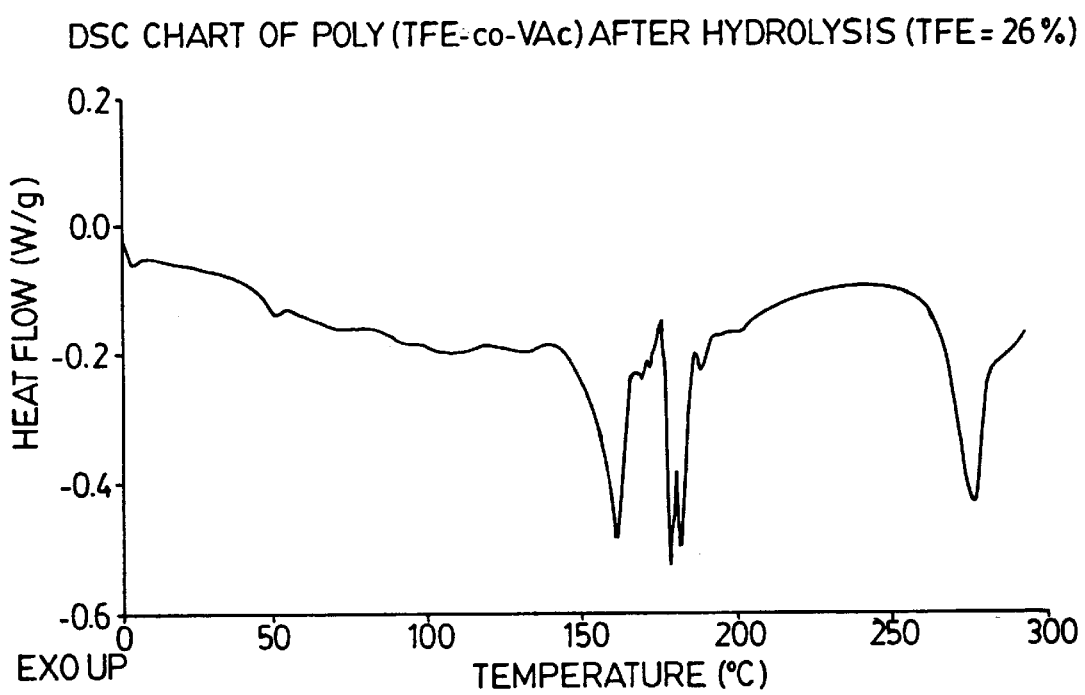
FIG. 3 shows the differential scanning calorimetry graph of hydrolyzed poly(tetrafluoroethylene-co-vinyl acetate) [i.e. poly(tetrafluoroethylene-co-vinyl alcohol)], having 26 mol % TFE. The 4 melting peaks demonstrate crystalline regions associated with TFE and vinyl alcohol, which reflects the "blocky" nature of this copolymer.

As used herein, the term "supercritical" has its conventional meaning in the art. A supercritical fluid is a substance above its critical temperature and critical pressure. $CO_2$ facilitates contact of the fluorocarbon and hydrocarbon monomers such that copolymers with a single, narrow glass transition temperature ($T_g$) may be formed. Furthermore, by using highly reactive hydrocarbon monomers that are sterically encumbered, such as tertiary butyl acrylate, more homogeneous copolymers may be prepared. This also results in minimization of unwanted fluorocarbon homopolymer side-products. Interestingly when polymerizations are carried out under surfactant-free conditions in $CO_2$, linear copolymers of a fluorocarbon monomer, such as TFE (among others), and a hydrocarbon monomer, such as VAc (among others), yield polymers with multiple melting point temperatures when hydrolyzed; this reflects a "blocky" structure (see DSC in FIG. 3). This may be particularly attractive for applications requiring surface activity, such as coatings, films, and surfactants, among others familiar to those skilled in the art. These may serve as rheology enhancers as well.

The copolymers are prepared in the presence of a free radical polymerization initiator, which is soluble in carbon dioxide. Suitable free radical initiators include any suitable initiators known to those skilled in the art. Useful initiators include but are not limited to, fluorocarbon diacylperoxides (e.g. bis(perfluoro-2-propoxypropionyl)peroxide, $[F(CF_2)_3 OCF(CF_3)CO_2]_2$), dialkyl peroxydicarbonates (e.g. diethyl peroxydicarbonate, $[H(CH_2)_2OCO_2]_2$), and perfluoro- or alkyl azo compounds (e.g. $[(CF_3)_2N=]_2$ or 2,2'-azobisisobutyronitrile, AIBN), respectively. Preferably, the initiator is a dialkyl peroxydicarbonate, and more preferably, the initiator is diethyl peroxydicarbonate.

In the present invention, surfactants or dispersing agents may be advantageous for synthesizing more homogeneous copolymers and stabilizing the polymerization when the fraction of fluoromonomer is relatively low. Surfactants that may be used in the present invention include any suitable surfactants known to those skilled in the art. The surfactant may also be a fluorocarbon-block-hydrocarbon oligomer such as, but not limited to, commercially available products such as DuPont's Zonyl™ FSO-100, FSN-100, and 3M's Fluorad™ FC-171, FC-170C. The latter surfactants have relatively high solubility in polar solvents. This is advantageous for copolymer purification as will become apparent herein. Nonetheless, surfactants are not necessarily required for successful synthesis of linear copolymers. Purification is then further simplified and a different structure may result.

The polymerization reaction may also include other additives. For example, the polymerization medium may contain a co-solvent such as but not limited to, perfluorocarbons or hydrofluorocarbons. The co-solvent may be used to solvate or dilute the initiator or surfactant such that they may be provided to the reaction in a solubilized and/or lower concentration form. The polymerization reaction may also include additives known to those skilled in the art for controlling the physical or chemical properties of the resulting copolymers. Such compounds include chain transfer agents for regulating copolymer molar mass or compounds which accelerate the decomposition of the initiator. Suitable chain transfer agents include but are not limited to, mercaptans (e.g. n-butanethiol), and alkyl halides (e.g. methyl iodide). Suitable compounds which accelerate initiator decomposition include but are not limited to, redox systems, sulfur dioxide, and ultraviolet light.

The polymerization reaction may be carried out at practical temperatures from 0° C. to about 200° C. Preferably, it is carried out at temperatures between 35° C. and 75° C. The polymerization reaction may be carried out at pressures ranging from about 50 bar to a practical limit of 650 bar. Preferably, polymerization reactions are carried out at pressures ranging from about 200 to 350 bar.

Linear copolymers may be prepared batch-wise or continuously in any appropriately designed high-pressure reaction vessel. Preferably, the copolymers are prepared batch-wise in a suitable high pressure reaction vessel that may include a means of heating, such as an electric heating jacket, to heat and maintain the polymerization reaction at the desired temperature, and a mixing apparatus such as magnetic stirring or magnetically coupled mechanical stirring. In addition, the reaction vessel may include a cooling system to remove excess heat from the polymerization. When the polymerization is complete, the copolymer may be separated from the reaction mixture by venting the $CO_2$. Thereafter, the polymer may be collected by physical isolation.

It may be desirable, for some applications, to purify the resulting copolymer before further processing. For example, it may be desirable to remove residual surfactant from the copolymer. The copolymer may be washed in a wash fluid comprising $CO_2$ before or after venting the polymerization medium to atmospheric pressure. Alternatively, the copolymer may be purified by precipitation or preferably blending in a solvent or solvent mixture which is a solvent for the surfactant but not the copolymer. For example, such solvents or solvent mixtures may include but are not limited to, water, methanol, water and methanol mixtures, water and ethanol mixtures, and tetrahydrofuran. It may also be desirable to modify or alter the physical properties of the polymer for other applications. For example, it may be desirable to convert vinyl acetate groups in the copolymer to vinyl alcohol by hydrolysis, thereby creating a new co- or ter-polymer with reactive functionality for further modification. Furthermore, copolymers containing acrylates or methacrylates may be esterified or trans-esterified, resulting in new acrylate or methacrylate copolymers, or hydrolyzed to the carboxylic acid or salt. Hydrolysis or esterification reactions may be carried out with a variety of reagents and are known to those skilled in the art. For example, vinyl acetate copolymers may be hydrolyzed in aqueous ethanol containing sulfuric acid. Additionally, acrylic acid or alkyl acrylate containing copolymers may be esterified or trans-esterified, respectively, to an ethyl acrylate containing copolymer using hydrochloric acid in ethanol.

The fluoropolymers of the present invention are essentially linear as a consequence of synthesis in $CO_2$. That is, there is a minimal decrease in molar mass and typically no decrease in viscosity upon hydrolysis, indicative of either no, or very low concentrations, of branches (such as esters) in the polymer backbone. The copolymers may contain a broad range of the fluorocarbon repeat units, they may be soluble in common organic solvents, they may have weight average molar masses above $10^5$ g mol$^{-1}$.

Upon hydrolysis or trans-esterification, there is only a minor change in molar mass as measured by GPC. For some of the copolymers, the change in GPC molar mass is reflective of the change in average repeat unit mass. Hydrolyzed fluoropolymers typically may have increased intrinsic viscosity relative to their parent copolymer. Changes in intrinsic viscosity with hydrolysis or trans-esterification are most likely related to solvent-polymer interactions and not due to ester hydrolysis in the polymer backbone. The latter would result in a decreased intrinsic viscosity and reflect radical hydrogen abstraction during propagation (i.e. branching).

General Procedures

Materials

Vinyl acetate (VAc), acrylic acid (AA), tertiary butyl acrylate (tBA), and chlortrifluroethylene (CTFE) were obtained from Aldrich (Ontario, Canada) and used as received. Vinylidene fluoride (VF$_2$) was obtained from Lancaster (Windham, N.H.). TFE was prepared by vacuum pyrolysis of polytetrafluoroethylene (Aldrich, Ontario, Canada) according to Hunadi et al. (*Synthesis* 1982) and stored at room temperature over d-limonene in a 300 mL stainless steel sample cylinder fifted with an 1800 psi safety rupture disc. The inhibitor was removed from TFE and CTFE by inline filtration through chromatographic silica gel (200–425 mesh, Fisher Scientific, Ontario, Canada) prior to use. The diethyl peroxydicarbonate (DEPDC) initiator was prepared using a variation of a published procedure (Strain et al. *J. Am. Chem. Soc.* 1950) and stored in THF or Freon 113™ over anhydrous magnesium sulfate at −20° C. The initiator was standardized by iodometry and was typically 5.0 to 7.5 % (w/w). Fluorad™ FC-171 and FC-170C were kindly provided by 3M (St. Paul, Minn.) and used as received. SFC purity CO$_2$ was obtained from Matheson (Ontario, Canada). Acetone, ethyl acetate, ethanol, THF, concentrated sulfuric acid, and concentrated hydrochloric acid were obtained from Fisher Scientific (Ontario, Canada). Water was deionized and distilled from Millipore Milli-RO 10 Plus and Milli-Q UF Plus (Bedford, Mass.) systems and used at 18 MΩ resistance.

Characterization

Polymer molar masses were characterized by gel permeation chromatography (GPC) and/or viscometry. The GPC (Waters U6K injector, 510 pump) was equipped with a refractive index detector (Waters 2410) and a series of Ultrastyrogel® columns (Waters $10^6$, $10^4$ and 500 Å). Using an ethyl acetate mobile phase (1 mL min$^{-1}$), polymer molar masses were calculated relative to polystyrene standards (Aldrich, Ontario, Canada). Viscosities were measured in ethyl acetate, ethanol, and DMSO at 30° C. using Cannon Ubbelohde viscometers (0 C. for ethyl acetate, 1 C. for other solvents). From a series of dilute solutions, intrinsic viscosities were measured by extrapolation to zero concentration using a dual Huggins/Kramer plot. Fourier transform infrared (FTIR) absorbance spectra (16 scans, 4 cm$^{-1}$ resolution) were obtained from thin polymer films using a Galaxy Series 5000 spectrometer. Thin films were prepared from ~2% w/v THF or ethanol solutions cast onto NaCl or ZnSe disks, respectively. $^1$H- and $^{19}$F-Nuclear magnetic resonance (NMR) spectra were obtained in CDCl$_3$, acetone-d$_6$, or DMSO-d$_6$ on a Varian Gemini spectrometer at 300.75 and 282.33 MHz, respectively, using TMS and α,α,α-trifluorotoluene (Aldrich, Ontario, Canada) as references. Glass transition temperatures (Tg) were measured using a DuPont 2000 differential scanning calorimeter. Elemental analyses were done by Canadian Microanalytical Service Ltd. (Delta, British Columbia, Canada).

EXAMPLES

Example 1

TFE/VAc Copolymers with Surfactant

This example illustrates the synthesis of TFE with VAc copolymers (poly(TFE-co-VAc)s) in CO$_2$. Polymerizations were carried out in a custom built, 50 mL, stainless steel, and high-pressure reactor. The head of the reactor was fitted with a Parr® (Moline, Ill.) A1120HC magnetic drive. The base of the reactor was heated by a removable stainless steel water jacket connected to a temperature controlled water bath (model 1160A, VWR, Ontario, Canada).

The reactor was sealed and evacuated (P≦0.01 mmHg). The base of the reactor was then chilled to approximately −50° C. using a liquid nitrogen bath. Meanwhile, the desired amount of DEPDC in THF was added to a cold 25 mL test tube. The test tube was evacuated (P~0.1–1 mmHg) to remove most of the THF. Then the desired amount of chilled VAc (T~0° C.) and 1.00 g of Fluorad FC-171 surfactant were added. The test tube contents were mixed by shaking and then transferred by cannula to the evacuated reactor. The reactor was evacuated again to degas the VAc. With stirring, the desired amount of TFE was added to the reactor for a total monomer weight of 20 g. CO$_2$ was then added and maintained at a pressure of 20 to 40 bar while warming the reactor to approximately 5° C. At that temperature, CO$_2$ was condensed into the reactor at a pressure of 56±5 bar over 1 to 2 minutes. The preheated water jacket was placed around the base of the reactor. The reactor was heated to the desired polymerization temperature (45±1° C.) over a period of 30 to 40 minutes. Pressures were initially between 230 and 260 bar.

Polymerizations were stopped after 24 hours by first cooling the reactor to room temperature and slowing the rate of stirring. The reactor was then slowly vented to atmospheric pressure. At a pressure of less than 60 bar, stirring was stopped as the polymer coagulated and started to bind the stir shaft. The reactor was then fully vented to atmospheric pressure and opened. The white and tacky solid, which had formed in the reactor, was dissolved in acetone and quantitatively removed and precipitated into water to give a white polymer. The polymer was purified by blending in ice-cold water/ethanol (400 mL, 1:1 v/v). The polymer was collected by vacuum filtration and washed several times with water before drying (40° C., P<0.1 mmHg). Poly(TFE-co-VAc)s were synthesized at four TFE and two initiator concentrations, the results of which are summarized in Table 1.

The copolymer compositions were estimated using elemental analysis and mass balance. For the latter, it was assumed that: (1) all of the VAc monomer was incorporated into the copolymer and (2) the polymer had been quantitatively isolated from the reactor. Using these assumptions, which are false, a lower limit fraction of TFE in the copolymer ($\bar{F}_{TFE}$) was calculated from the difference between the polymer yield and the initial mass of VAc monomer. Thus elemental analysis provides the best estimate of copolymer composition.

TABLE 1

TFE/VAc Copolymers synthesized with surfactant

|  | Sample 1 | Sample 2 | Sample 3 | Sample 4 | Sample 5 |
|---|---|---|---|---|---|
| TFE in Feed ($f_{TFE}$, mol %) | 20 | 48 | 67 | 67 | 80 |
| Initiator (wt. %) | 0.38 | 0.38 | 0.38 | 1.5 | 0.38 |
| Yield (wt. %)[a] | 80 | 78 | 70 | 71 | 60 |
| Composition |  |  |  |  |  |
| Mass Balance ($F_{TFE}$, mol %) | — | 34 | 53 | 54 | 67 |
| Elem. Analysis[b] | 18 | 40 | 58 | 59 | 71 |
| Intrinsic Viscosity[c] (mL/g) | — | 39.4 | 31.0 | 16.5 | 17.6 |
| Glass Transition ($T_g$, °C.) | — | 38 | 37 | 37 | 35 |
| Mw/Mn/PDI (kg mol$^{-1}$) | 343/170/2.02 | 209/116/1.80 | 164/99.0/1.66 | 112/76.7/1.46 | 110/77.3/1.42 |

[a]Based on an initial total monomer weight of 20 g. [b]Determined from % C

As shown in Table 1, initiator concentration affected molar mass but was of little consequence to copolymer composition. All of the polymers had $M_w$ greater than 100,000 g/mol and PDI lower than 2.

Example 2

TFE/VAc Copolymers without Surfactant

This example illustrates the synthesis of TFE/VAc copolymers in supercritical $CO_2$ without the use of surfactant. Polymerizations were carried out in a custom-built, 50 mL, stainless steel, high pressure reactor. The head of the reactor was fitted with a Parr (Moline, Ill.) A1120HC magnetic drive. The base of the reactor was heated by a removable stainless steel water jacket connected to a temperature-controller water bath (model 1160A, VWR, Ontario, Canada). The reactor was sealed and evacuated (P≦0.01 mmHg). The base of the reactor was then chilled to approximately −50° C. using a liquid nitrogen bath. Meanwhile, the desired amount of chilled VAc (T~0° C.) was added to a test tube then transferred by cannula to the evacuated reactor. The desired amount of initiator, diethyl peroxydicarbonate (0.5% w/w,) was then added to a test tube and transferred by cannula to the evacuated reactor. With stirring, the desired amount of TFE was added to the reactor for a total monomer weight of 20 g. $CO_2$ was then added and maintained at a pressure of 30–40 bar while warming the reactor to approximately 10° C. At that temperature, $CO_2$ was condensed into the reactor at a pressure of 56±5 bar over 1–2 min. The preheated water jacket was placed around the base of the reactor. The reactor was heated to the desired polymerisation temperature (45±1° C.) over a period of 10–15 min. Pressures were initially between 200 and 230 bar.

Polymerizations were stopped after 24 h by cooling the reactor to room temperature. The stirring was stopped and the reactor was slowly vented. At a pressure of less than 60 bar, the reactor was fully vented to atmospheric pressure and opened. The white and tacky solid, which had formed in the reactor, was dissolved in acetone, quantitatively removed and precipitated into water. The polymer was further purified by blending in 400 mL of an ice cold water and ethanol mixture (1:1, v/v). The polymer was collected by vacuum filtration and washed several times with water before drying (40° C., P<0.1 mmHg).

Characterization was performed as described in example 1. Polymer molar mass distributions were characterized by GPC (water U6K injector, 510 pump) equipped with a refractive index detector (Water 2410) and a series of Ultrastyragel columns (Water $10^6$, $10^4$, and 500 Å). Using an ethyl acetate mobile phase (1 mL/min), polymer molar masses were calculated relative to polystyrene standards (Aldrich, Ontario, Canada). $^1H$ and $^{19}F$ NMR spectra were obtained in deuterated chloroform on a Varian Gemini spectrometer at 300.75 and 282.33 MHz respectively, using TMS and α,α,α-trifluorotoluene as references. Elemental analysis was done by Canadian Microanalytical Service Ltd. (British Columbia, Canada). Table 2 summarizes the results for a range of copolymer compositions. The best estimate of copolymer composition is based on elemental analysis determined from % C and is italicized.

TABLE 2

TFE-VAc Copolymers synthesized without surfactants

| Analysis | Sample 6 | Sample 7 | Sample 8 |
|---|---|---|---|
| TFE in feed $f_{TFE}$ mol % | 50 | 34.5 | 13.1 |
| Initiator (wt %) | 0.5 | 0.5 | 0.5 |
| Yield (wt %)[a] | 70 | 79 | 76 |
| Copolymer Composition (mol %) ($F_{TFE}$ mol % Mass balance) | 31 | 19 | 8.3 |
| Copolymer Composition (mol %) ($F_{TFE}$ mol % Elemental Analysis)[b] | 35.5 | 26 | 7 |

TABLE 2-continued

TFE-VAc Copolymers synthesized without surfactants

| Analysis | Sample 6 | Sample 7 | Sample 8 |
|---|---|---|---|
| Intrinsic Viscosity (ml/g) | 40 | | |
| Glass Transition (Tg, °C.) | 41 | 39 | 34 |
| Mw/Mn/PDI (kg/mol) | 177/74.1/2.38 | 156/74.1/2.1 | 166/68.1/2.44 |

[a]Based on an initial total monomer weight of 20 g.
[b]Determined from % C

Example 3

Hydrolysis of TFE/VAc Copolymers

This example illustrates the hydrolysis of poly(TFE-co-VAc)s (samples 2 to 5 of Table 1), to yield new co- and terpolymers, poly(TFE-co-VAc-co-VA)s (where VA is vinyl alcohol). It also illustrates that the poly(TFE-co-VAc)s are predominantly linear. Furthermore it discusses the hydrolysis of TFE/VAc copolymer samples 6 to 8.

Briefly, to a 125 mL round bottom flask with a condenser and a magnetic stir bar, were added 3 g of polymer, 75 mL of ethanol, 1 mL of water and 0.5 mL of concentrated sulfuric acid. The flask was heated and the contents stirred and refluxed for 3 days. A nearly colorless, transparent solution resulted. The solution was then cooled to room temperature. Sodium bicarbonate was slowly added, with vigorous stirring, until the solution was neutral to pH paper. The polymer solution was precipitated into water with vigorous stirring, collected by vacuum filtration and repeatedly washed with water prior to drying (40° C., P<0.1 mmHg).

Figure 1:
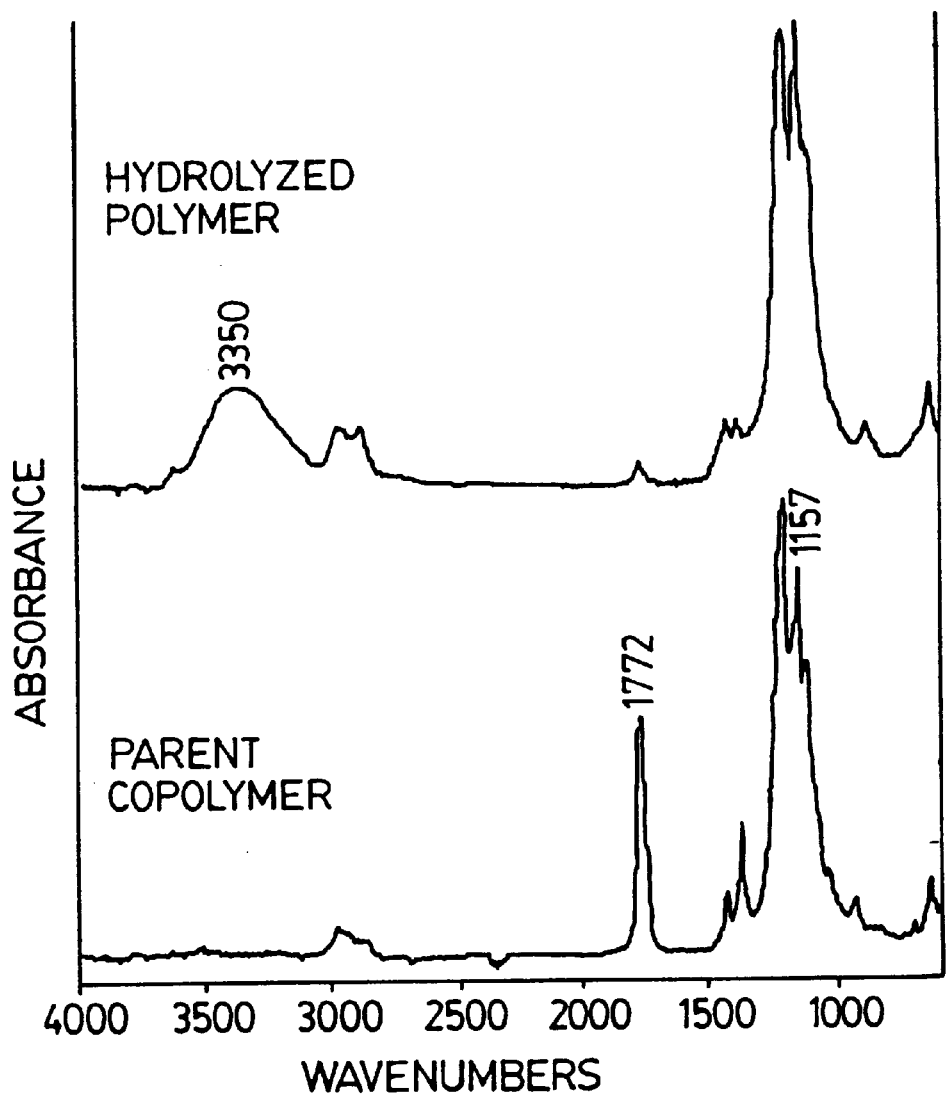
FIG. 1 shows the FTIR spectra of poly(TFE-co-VAc) before and after hydrolysis.

The extent of hydrolysis was estimated from FTIR, by a large decrease in the VAc carbonyl absorption (1772 cm$^{-1}$) and the appearance of a hydroxyl absorption (ca. 3350 cm$^{-1}$). The extent of hydrolysis was calculated by the change in the carbonyl absorption relative to a reference absorption (ca. 1120 or 1157 cm$^{-1}$) in which the intensity did not change significantly following hydrolysis. As listed in Table 3, most of the VAc groups were hydrolyzed to VA groups, see FIG. 1.

By comparing GPC molar mass data, molar mass decreased slightly and polydispersity (PDI) increased after hydrolysis. Furthermore, intrinsic viscosities were slightly higher after hydrolysis. To determine whether the decrease in molar mass was simply due to pendant group hydrolysis or a result of hydrolyzed esters in the polymer backbone, the expected molar mass decrease was compared to that observed. This was done by comparing the hydrolyzed (H) to parent (P) molar mass ratios. The expected decrease was calculated from the molar mass of the average repeat-unit of the hydrolyzed to parent copolymers ($M_H/M_P$). $M_P$ and $M_H$ were both calculated from elemental analysis data, with the extent of hydrolysis being factored into $M_H$ as outlined in equation [1] and listed in Table 3.

$$M_H/M_P(\text{expected}) = \frac{\overline{F}_{TFE}MW_{TFE} + (1 - \overline{F}_{TFE})[(1-H)MW_{VAc} + (H)MW_{VA}]}{\overline{F}_{TFE}MW_{TFE} + (1 - \overline{F}_{TFE})MW_{VAc}} \quad [1]$$

In equation [1], $MW_{TFE}$, $MW_{VAc}$, $MW_{VA}$ are the molar masses of TFE, VAc, and VA, respectively. $\overline{F}_{TFE}$ is the fraction of TFE in the copolymer from elemental analysis and H is the mole fraction of VAc that was hydrolyzed. The observed decreases were calculated using the GPC determined number and weight average molar mass ratios, $Mn_H/Mn_P$ and $Mw_H/Mw_P$, respectively.

TABLE 3

Hydrolysis of Poly(TFE-co-VAc)s

| | Sample 2 | Sample 3 | Sample 4 | Sample 5 |
|---|---|---|---|---|
| VAc Hydrolyzed (mol %) | 98 | 96 | 92 | 92 |
| Mw/Mn/PDI (kg mol$^{-1}$) | 194/69.9/2.77 | 152/77.8/1.95 | 116/61.9/1.87 | 100/64.4/1.55 |
| Intrinsic Viscosity[a] (mL g$^{-1}$) | 42.1 | 37.8 | 20.9 | 21.8 |
| Glass Transition (T$_g$, °C.) | 75 | 65 | — | — |
| Expected Mass Decrease ($M_H/M_P$) | 0.70 | 0.80 | 0.83 | 0.86 |
| Observed ($Mn_H/Mn_P$) Mass Decrease | 0.60 | 0.79 | 0.81 | 0.83 |
| ($Mw_H/Mw_P$) | 0.93 | 0.94 | 1.04 | 0.91 |

[a]From dilute solutions in ethyl acetate at 30° C.

Figure 2:
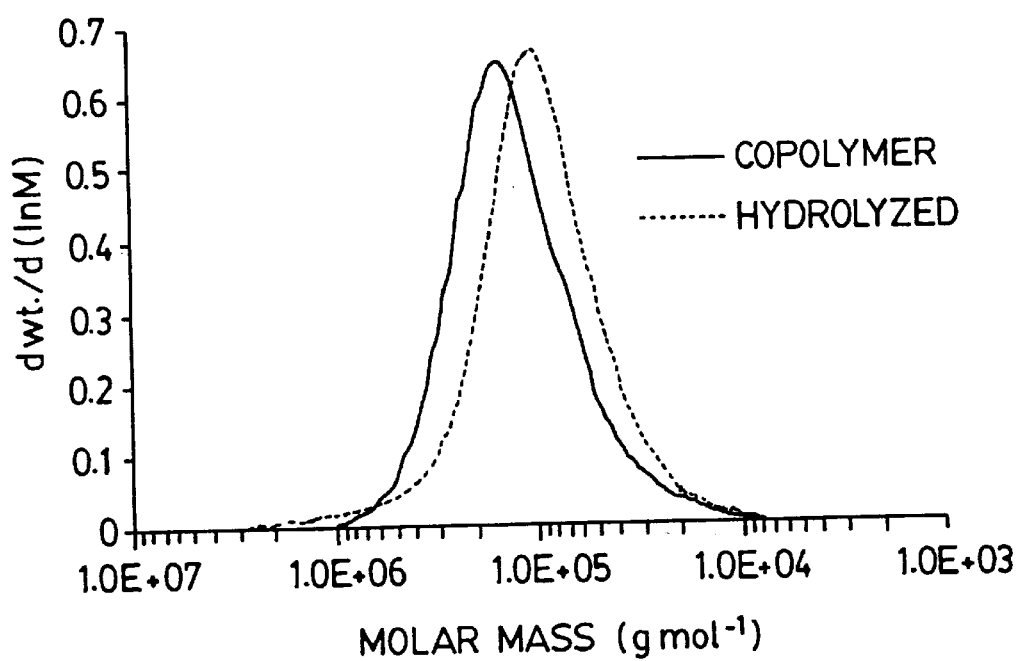
FIG. 2 shows the molar mass distribution of poly(TFE-co-VAc) before and after hydrolysis.

The observed ($Mn_H/Mn_P$) are similar to the expected mass decrease ($M_H/M_P$), yet in all cases, $Mw_H/Mw_P$ are consistently higher than the respective $M_H/M_P$. The distribution of molar mass shifted to lower molar mass as a result of hydrolysis, yet a small high molar mass tail appeared in the GPC distributions, as exemplified in FIG. 2. It is likely that some of the higher molar mass polymer chains condensed under acidic hydrolysis conditions and accounts in the discrepancy between the observed $Mw_H/Mw_P$ and the expected $M_H/M_P$ decreases. Although hydrolyses were carried out in dilute solutions in the presence of water, the high molar mass tail was evident in all distributions. Base hydrolysis (U.S. Pat. No. 5,723,556) was ineffective, resulting in discoloration of the polymer, likely because of elimination reactions. Overall, the similarity between the expected and observed mass decreases, taken together with the intrinsic viscosity data, indicates that the poly(TFE-co-VAc)s synthesized in $CO_2$ are predominantly linear.

For samples 6–8 of Table 2, when the fraction of VAc is approximately 70 mol % or greater, the hydrolyzed copolymer, poly(TFE-co-VA) is insoluble in THF and ethyl acetate, two common organic solvents used in GPC, thereby making analysis by GPC difficult. To assess linearity, sample 8 was analyzed by viscosity before and after hydrolysis. The intrinsic viscosity of both samples was essentially the same. While one might expect that viscosity would decrease for the hydrolyzed sample, reflecting the decrease in molar mass after hydrolysis, the viscosity likely remained constant due to a change in hydrodynamic volume of the hydrolyzed vs. parent copolymer. For example, the hydrolyzed copolymer can interact with the solvent via hydrogen bonding interactions more easily than the parent copolymer; these hydrogen-bonding interactions increase the hydrodynamic volume and the observed viscosity. These data also indicate that the surfactant-free polymerized copolymers are predominantly linear and do not involve hydrogen abstraction of the vinyl acetate.

An advantage of this synthesis of the terpolymer is the vinyl alcohol of the terpolymer provides a reactive functionality for further modification, a non-limiting example being cross-linking with, but not limited to, diisocyanates.

Terpolymers prepared from copolymer precursors wherein one of the repeat units of the copolymer can be converted to various extents to another repeat unit also fall within the scope of the present invention. For example, vinyl acetate is a precursor to vinyl alcohol; acrylate is a precursor to acrylic acid; and nitrile is a precursor to amine or carboxylic acid.

Example 4

CTFE/VAC Copolymers with or without Surfactant

This example illustrates the synthesis of CTFE with VAc copolymers (poly(CTFE-co-VAc)s) in $CO_2$. Polymerizations were carried out in a custom built, 50 mL, stainless steel, and high-pressure reactor. The head of the reactor was fitted with a Parr® (Moline, Ill.) A1120HC magnetic drive. A removable electric heating jacket heated the base of the reactor. The reactor was equipped with a water-cooling loop within the wall of the reactor base. The heating jacket and cooling loop were controlled using a Parr® (Moline, Ill.) 4843 temperature controller.

The reactor was sealed and evacuated (P≦0.01 mmHg). The base of the reactor was then chilled to approximately −50° C. using a liquid nitrogen bath. The desired amount of chilled VAc (T~0° C.) and 1.00 g of Fluorad™ FC-171 surfactant were added by cannula to the reactor, followed by the desired amount of cold DEPDC in Freon 113™. The reactor was evacuated again to degas the VAc. With stirring, the desired amount of CTFE was added to the reactor for a total monomer weight of 20 g. $CO_2$ was then added and maintained at a pressure of 20 to 40 bar while warming the reactor. At temperatures between 5 and 10° C., heating was stopped and $CO_2$ was condensed into the reactor at a pressure of 56±5 bar over 1 to 2 minutes. Heating was resumed and the reactor was heated to the desired polymerization temperature 45° C. over a period of 5 to 10 minutes. Pressures were initially between 180 and 220 bar. Pressures were adjusted to 207 bar once the reactor had reached the desired temperature, using an HIP® (Erie, Pa.) pressure generator (model 62-6-10). Polymerizations were stopped after 24 hours and the polymer was isolated as described in example 1. Table 4 summarizes the results for four poly (CTFE-co-VAc) copolymers. Sample 12 was prepared identically except without the addition of a surfactant (i.e. in the absence of Fluorad FC-171).

TABLE 4

| | Copolymers of CTFE and VAc | | | |
|---|---|---|---|---|
| | Sample 9 | Sample 10 | Sample 11 | Sample 12* |
| CTFE in Feed ($\bar{f}_{CTFE}$, mol %) | 20 | 50 | 67 | 14.5 |
| Initiator (wt. %) | 0.41 | 0.54 | 0.41 | 0.5 |
| Yield (wt. %) | 88 | 77 | 60 | 84 |
| Composition[a] ($\bar{F}_{CTFE}$, mol %) | 23 | 41 | 51 | 16.6 |
| Mw/Mn/PDI (kg mol$^{-1}$) | 261/107/2.44 | 264/130/2.03 | 138/75.2/1.84 | 182/68/2.67 |
| Intrinsic Viscosity[b] (mL/g) | — | 30.5 | — | — |

[a]Determined from % C elemental analysis.
[b]From dilute solutions in DMSO at 30° C.
*synthesized without surfactant

Example 5

Hydrolysis of CTFE/VAc Copolymers

This example illustrates the hydrolysis of poly(CTFE-co-VAc) (sample 10 of Table 4), to yield a new terpolymer, poly(CTFE-co-VAc-co-VA). It also illustrates that the poly (TFE-co-VAc)s are predominantly linear given that the same trend in intrinsic viscosity with hydrolysis is observed in this example as was observed for the poly(TFE-co-VAc)s. Unfortunately, a suitable GPC solvent for both the parent and hydrolyzed poly(CTFE-co-VAc)s and the GPC standards was not available.

Briefly, to a 125 mL round bottom flask with a condenser and a magnetic stir bar, were added 3 g of polymer, 35 mL of ethanol, 35 mL of $CHCl_3$, 1 mL of water, and 0.5 mL of concentrated sulfuric acid. The flask was heated and the contents stirred and refluxed for 2 days. A nearly colorless, transparent solution resulted. The solution was then cooled to room temperature. Sodium bicarbonate was slowly added, with vigorous stirring, until the solution was neutral to pH paper. The polymer solution was precipitated into water with vigorous stirring, collected by vacuum filtration and repeatedly washed with water prior to drying (40° C., P<0.1 mmHg). FTIR indicated that 27 mol % of the VAc had been hydrolyzed to VA. The intrinsic viscosity in DMSO at 30° C. was found to be 35.0 mL/g. Furthermore, a 1.5 g sample of the 27 mol % hydrolyzed polymer was similarly re-hydrolyzed in 56 mL of ethanol, 19 mL of CHCl$_3$, 1 mL of water, and 0.5 mL of concentrated sulfuric acid for 3 days. FTIR indicated that 81 mol % of the VAc had been hydrolyzed to VA. The intrinsic viscosity in DMSO at 30° C. was found to be 47.0 mL/g.

Example 6

VF$_2$/VAC Copolymers with or without Surfactant

This example illustrates the synthesis of VF$_2$ with VAc copolymers (poly(VF$_2$-co-VAc)s) in CO$_2$. Polymerizations were carried out in the reactor described in example 4. The reactor was sealed and evacuated (P≦0.01 mmHg). The base of the reactor was then chilled to approximately −50° C. using a liquid nitrogen bath. The desired amount of chilled VAc (T~0° C.) and 1.00 g of Fluorad™ FC-170C surfactant were added by cannula to the reactor, followed by the desired amount of cold DEPDC in Freon 113™. The reactor was evacuated again to degas the VAc. With stirring, the desired amount of VF$_2$ was added to the reactor for a total monomer weight of 20 g. CO$_2$ was then added and maintained at a pressure of 20 to 40 bar while warming the reactor. At temperatures between 5 and 10° C., heating was stopped and CO$_2$ was condensed into the reactor at a pressure of 56±5 bar over 1 to 2 minutes. Heating was resumed and the reactor was heated to the desired polymerization temperature 45° C. over a period of 5 to 10 minutes. Pressures were initially between 180 and 220 bar. Pressures were adjusted to 207 bar once the reactor had reached the desired temperature, using a HIP® (Erie, Pa.) pressure generator (model 62-6-10). Polymerizations were stopped after 24 hours and the polymer was isolated as described in example 1. Table 5 summarizes the results for four poly (VF$_2$-co-VAc) copolymers. Sample 16 was synthesized identically except without the addition of a surfactant (i.e. in the absence of Fluorad FC-171).

Unfortunately, a suitable GPC solvent for both the parent and hydrolyzed poly(VF$_2$-co-VAc) and the GPC standards could not be found.

Briefly, to a 125 mL round bottom flask with a condenser and a magnetic stir bar, were added 1 g of polymer, 35 mL of ethanol, 1 mL of water, and 0.5 mL of concentrated sulfuric acid. The flask was heated and the contents stirred and refluxed for 2 hours. A nearly colorless, transparent solution resulted. The solution was then cooled to room temperature. Sodium bicarbonate was slowly added, with vigorous stirring, until the solution was neutral to pH paper. The polymer solution was precipitated into water with vigorous stirring, collected by vacuum filtration and repeatedly washed with water prior to drying (40° C., P<0.1 mmHg). FTIR indicated that 30 mol % of the VAc had been hydrolyzed to VA. The intrinsic viscosity in DMSO at 30° C. was found to be 63.9 mL/g.

Example 8

Hydrolysis of VF$_2$/VAC Copolymers

This example illustrates the hydrolysis of poly(VF$_2$-co-VAc) (sample 15 of Table 5), to yield a new terpolymer, poly(VF$_2$-co-VAc-co-VA). It also illustrates that poly(VF$_2$-co-VAc), where the fraction of VF$_2$ in the monomer feed was relatively high, is predominantly linear given that the same trend in intrinsic viscosity with hydrolysis is observed in this example as was observed for the poly(TFE-co-VAc)s. Unfortunately, a suitable GPC solvent for both the parent and hydrolyzed poly(VF$_2$-co-VAc) and the GPC standards could not be found.

Briefly, to a 125 mL round bottom flask with a condenser and a magnetic stir bar, were added 1 g of polymer, 35 mL of ethanol, 1 mL of water, and 0.5 mL of concentrated sulfuric acid. The flask was heated and the contents stirred and refluxed for 2 hours. A nearly colorless, transparent solution resulted. The solution was then cooled to room temperature. Sodium bicarbonate was slowly added, with vigorous stirring, until the solution was neutral to pH paper. The polymer solution was precipitated into water with

TABLE 5

Copolymers of VF$_2$ and VAc

|  | Sample 13 | Sample 14 | Sample 15 | Sample 16 |
|---|---|---|---|---|
| VF$_2$ in Feed ($f_{VF2}$, mol %) | 37 | 50 | 67 | 23.3 |
| Initiator (wt. %) | 0.51 | 0.53 | 0.47 | 0.5 |
| Yield (wt. %) | 58 | 46 | 30 | 69 |
| Composition[a] ($F_{VF2}$, mol %) | 19 | 20 | 25 | 7.3 |
| Mw/Mn/PDI (kg mol$^{-1}$) | 98.7/53.8/1.83 | 66.6/40.9/1.63 | 68.9/47.9/1.44 | 121/54/2.24 |
| Intrinsic Viscosity[b] (mL/g) | 32.8 | — | 18.3 | — |

[a]Determined from % C elemental analysis.
[b]From dilute solutions in DMSO at 30° C.
*synthesized without surfactant.

Example 7

Hydrolysis of VF$_2$/VAc Copolymers

This example illustrates the hydrolysis of poly(VF$_2$-co-VAc) (sample 13 of Table 5), to yield a new terpolymer, poly(VF$_2$-co-VAc-co-VA). It also illustrates that poly(VF$_2$-co-VAc), where the fraction of VF$_2$ in the monomer feed was relatively low, is predominantly linear given that the same trend in intrinsic viscosity with hydrolysis is observed in this example as was observed for the poly(TFE-co-VAc)s.

vigorous stirring, collected by vacuum filtration and repeatedly washed with water prior to drying (40° C., P<0.1 mmHg). FTIR indicated that 54 mol % of the VAc had been hydrolyzed to VA. The intrinsic viscosity in DMSO at 30° C. was found to be 22.0 mL/g.

Example 9

TFE/AA Copolymers

This example illustrates the reaction of TFE with acrylic acid (AA) and the heterogeneous nature of the resulting material as a consequence of the high intrinsic reactivity of AA. The material can be separated into two fractions; one that is soluble in ethanol and is a copolymer of TFE and M (poly(TFE-co-AA)), and a second fraction that is essentially pure polytetrafluoroethylene. The copolymer was not soluble in the ethyl acetate GPC solvent.

Polymerizations were carried out in the reactor described in example 4. The reactor was sealed and evacuated ($P \leq 0.01$ mmHg). The base of the reactor was then chilled to approximately −50° C. using a liquid nitrogen bath. The desired amount of AA and 1.00 g of Fluorad™ FC-170C surfactant were added by cannula to the reactor, followed by the desired amount of cold DEPDC in Freon 113™. The reactor was evacuated again to degas the AA. With stirring, the desired amount of TFE was added to the reactor for a total monomer weight of 20 g. $CO_2$ was then added and maintained at a pressure of 20 to 40 bar while warming the reactor. At temperatures between 5 and 10° C., heating was stopped and $CO_2$ was condensed into the reactor at a pressure of 56±5 bar over 1 to 2 minutes. Heating was resumed and the reactor was heated to the desired polymerization temperature (45° C.) over a period of 5 to 10 minutes. Pressures were initially between 180 and 220 bar. Pressures were adjusted to 248 bar once the reactor had reached the desired temperature, using a HIP[a] (Erie, Pa.) pressure generator (model 62-6-10).

Reactions were stopped after 24 hours and a white free flowing powder was isolated. The surfactant was extracted from the powder by dispersion in tetrahydrofuran, then centrifuged to collect the insoluble fraction. This essentially surfactant free fraction was dried in a vacuum oven to constant weight (40° C., P<0.1 mmHg) and the yield determined. A sample of the surfactant free fraction was then dispersed in ethanol and the soluble polymer was isolated by centrifuging and decanting the supernatant (3 times). The supernatant fractions were combined and the solvent evaporated in a Petri dish to give a colorless transparent film. The film and residual insoluble fraction were dried in a vacuum oven to constant weight (40° C., P<0.1 mmHg). Table 6 summarizes the results for two TFE with AA reactions.

TABLE 6

Reaction of TFE with AA

|  | Sample 17 | Sample 18 |
|---|---|---|
| TFE in Feed ($\bar{f}_{TFE}$, mol %) | 33 | 67 |
| Initiator (wt. %) | 0.50 | 0.50 |
| Yield (wt. %) | 85 | 51 |
| % Soluble in Ethanol (wt. %) | 86 | 54 |
| Composition[a] Parent Material | 27 | 42 |
| ($\bar{F}_{TFE}$, mol %)   Ethanol Soluble Fraction | 22 | 21 |
| Ethanol Insoluble Fraction | 100 | 98 |
| Intrinsic Viscosity[b] (mL/g) | 104 | 87.7 |

[a]Determined from % C elemental analysis.
[b]From dilute solutions in ethanol at 30° C.

Example 11

Esterification of TFE/AA Copolymer

This example illustrates the esterification of acrylic acid in poly(TFE-co-AA) (sample 17 of Table 6) with either ethanol (EA) or isopropanol (iPA) to yield either a co-polymer, poly(TFE-co-EA), or a terpolymer, poly(TFE-co-iPA-co-AA), respectively. Briefly, to 125 mL round bottom flasks with condensers and magnetic stir bars, were added 1 g of polymer and 50 mL of 1M hydrochloric acid in either ethanol or isopropanol. The flasks were heated and the contents stirred and refluxed overnight. Colorless, transparent solutions resulted. The solutions were poured into petri dishes and the solvents evaporated to leave colorless and transparent films. The films were dried further in a vacuum oven to constant weight (40° C., P<0.1 mmHg). $^1$H-NMR indicated that the acrylic acid in one of the polymers had been completely esterified to ethyl acrylate and that the other polymer was 61% esterified to isopropyl acrylate. Intrinsic viscosities in ethanol at 30° C.: poly(TFE-co-EA), 33.9 mL/g; poly(TFE-co-iPA-co-AA), 81.8 mL/g. Interestingly, poly(TFE-co-AA) and poly(TFE-co-iPA-co-AA) were thermoplastic materials but poly(TFE-co-EA) was a rubbery material. The esterification results suggest that poly(TFE-co-AA) is predominantly linear given that there is not a large decrease in viscosity with iPA esterification. Esterification to EA resulted in a slightly larger viscosity decrease. Overall, viscosity decreases are likely due to changes in solvent-polymer interaction and not a result of trans-esterification of esters in the polymer backbone. The viscosity decreases are the opposite to what was observed for VAc hydrolysis, where better solvent polymer interactions through hydrogen bonding resulted in an increase in viscosity.

Example 12

TFE/tBA Copolymers

This example illustrates the copolymerization of TFE with tertiary butyl acrylate (tBA) to yield a significantly more homogenous copolymer material poly(TFE-co-tBA). The sterically encumbering nature of the tertiary butyl group appears to reduce the rate of acrylate homo-propagation, such that the resulting material is significantly more homogeneous. The material can be separated into two fractions; one large main fraction that is soluble in ethanol and is a copolymer, poly(TFE-co-tBA), and a second, much smaller fraction, that is essentially pure poly(tetrafluoroethylene). Polymerizations were carried out in the reactor described in example 4. The reactor was sealed and evacuated ($P \leq 0.01$ mmHg). The base of the reactor was then chilled to approximately −50° C. using a liquid nitrogen bath. The desired amount of tBA and 1.00 g of Fluorad™ FC-170C surfactant were added by cannula to the reactor, followed by the desired amount of cold DEPDC in Freon 113™. The reactor was evacuated again to degas the tBA. With stirring, the desired amount of TFE was added to the reactor for a total monomer weight of 20 g. $CO_2$ was then added and maintained at a pressure of 20 to 40 bar while warming the reactor. At temperatures between 5 and 10° C., heating was stopped and $CO_2$ was condensed into the reactor at a pressure of 56±5 bar over 1 to 2 minutes. Heating was resumed and the reactor was heated to the desired polymerization temperature (45° C.) over a period of 5 to 10 minutes. Pressures were initially between 180 and 220 bar. Pressures were adjusted to 207 bar once the reactor had reached the desired temperature, using a HIP® (Erie, Pa.) pressure generator (model 62-6-10).

Reactions were stopped after 24 hours and the polymer material was isolated from the reactor and purified as described in example 1. A sample of the material was dispersed in ethanol. The soluble polymer was isolated by centrifuging and decanting the supernatant (3 times). The supernatant fractions were combined and the solvent evaporated in a Petri dish to give a colorless transparent film. The film and residual insoluble fraction, if any, were dried in a vacuum oven to constant weight (40° C., P<0.1 mmHg).

Table 7 summarizes the results for three TFE with tBA copolymerizations.

TABLE 7

TFE/tBA Copolymers

|  | Sample 19 | Sample 20 | Sample 21 |
|---|---|---|---|
| TFE in Feed ($f_{TFE}$, mol %) | 0.33 | 0.50 | 0.67 |
| Initiator (wt. %) | 0.53 | 0.73 | 0.60 |
| Yield (wt. %) | 81 | 72 | 43 |
| % Soluble in Ethanol (wt. %) | 100 | 96 | 97 |
| Composition[a] Parent Material ($F_{TFE}$, mol %) | 15 | 31 | 24 |
| Ethanol Soluble Frac. | 15 | 29 | 20 |
| Ethanol Insoluble Frac. | — | 98 | 100 |
| Mw/Mn/PDI (kg mol$^{-1}$) | 299/99.3/3.01 | 189/80.9/2.34 | 114/58.9/1.93 |
| Intrinsic Viscosity[b] (mL/g) | 36.4 | 22.0 | 17.6 |

[a]Determined from % C elemental analysis.
[b]From dilute solutions in ethanol at 30° C.

Example 13

Trans-esterification of Poly(TFE-co-tBA)

This example illustrates the trans-esterification of poly (TFE-co-tBA) (sample 20 of Table 7) using acidic ethanol or isopropanol using the procedure described in example 10. Reaction with acidic ethanol resulted in complete trans-esterification to poly(TFE-co-EA), as indicated by $^1$H-NMR and a relative decrease in viscosity (14.3 mL/g). Reaction of the poly(TFE-co-EA), in acidic isopropanol, resulted in 27 mol % trans-esterification to iPA with approximately 9 mol % hydrolysis to AA. However, the intrinsic viscosity of this fluoropolymer (poly(TFE-co-EA-co-iPA-co-AA), 27.3 mL/g) was greater than the parent copolymer, poly(TFE-co-tBA). Furthermore, reaction of the parent tBA copolymer in acidic isopropanol resulted in 62 mol % trans-esterification and 38 mol % hydrolysis. This terpolymer (poly(TFE-co-iPA-co-AA), 33.7 mL/g) had the highest viscosity. Overall, these result confirmed that poly(TFE-co-tBA)s were predominantly linear and that changes in intrinsic viscosity were primarily due to changes in solvent-polymer interaction and not a result of trans-esterification of esters in the polymer backbone, resulting from radical hydrogen abstraction.

A series of poly(TFE-co-VAc)s have been synthesized in supercritical $CO_2$ and very surprisingly have been found to be essentially linear. Radical hydrogen abstraction chain transfer reactions, which are characteristic of the copolymerization of many hydrocarbon monomers with fluoromonomers, were apparently suppressed relative to propagation as a consequence of using $CO_2$ as the continuous phase. As a result, predominantly linear copolymers were formed which are more robust than those formed by aqueous emulsion.

Another surprising result of the present invention relates to the use of the oligomeric nonionic surfactant, sold under the name FC-171 Fluorad®. Use of this nonionic surfactant increased the yield several times over previous methods of synthesis and it is contemplated that other similar nonionic surfactants will exhibit a similar efficacy for increasing the reaction yield. This oligomeric nonionic surfactant includes a $CO_2$ phobic portion and a $CO_2$ philic portion. Even more surprising is that these copolymers can be prepared without surfactants and that the resulting polymeric structure has a blocky character. Surfactant-free polymerized linear copolymers have the added advantage of facilitated purification. This is particularly important in coatings and other applications.

A further surprising result of the present invention is the breadth of polymer compositions that can be achieved in the copolymers. For example in poly(TFE-co-VAc) it has been shown that compositions of 7 mol % to about 71 mol % TFE can be obtained and for poly(CTFE-co-VAc) compositions from about 16 mol % to about 51 mol % CTFE have been obtained.

Utility

The linear fluoropolymers of the present invention are more homogenous and likely more robust than their aqueous emulsion or organic solvent synthesized analogs where compositions are limited to a narrow range and polymers are often highly branched. The linear fluoropolymers disclosed herein are useful in areas where their analogs or conventional fluoropolymers are used and may be useful in additional areas where the synthetic limitations of emulsion and organic solvent-synthesized methods have limited their utility. For example, the fluoropolymers may be employed in applications such as, but not limited to, coatings, wire coatings, microelectronics, optical applications including optical fiber claddings, gaskets, seals, vessel linings, elastomers, protective coatings, paints, holograms/holographics, imaging technologies, biomedical applications, additives, surfactants, etc. The present invention may provide fluoropolymers with properties tailored to specific applications instead of having the application fit the fluoropolymer.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

Therefore what is claimed is:

1. A linear copolymer comprising a fluorocarbon repeat unit and a hydrocarbon repeat unit, said fluorocarbon repeat unit being selected from the group consisting of tetrafluoroethylene, trifluoroethylene, chlorotrifluoroethylene, vinylidene fluoride, and vinyl fluoride and said hydrocarbon repeat unit being selected from the group consisting of vinyl acetate, vinyl alcohol, acrylic acid, acrylates and methacrylates.

2. The linear copolymer according to claim 1 wherein said fluorocarbon repeat unit is tetrafluoroethylene and said hydrocarbon repeat unit is vinyl acetate.

3. The linear copolymer according to claim 2 has a composition in a range from about 7 mol % to about 71 mol % tetrafluoroethylene.

4. The linear copolymer according to claim 1 wherein said fluorocarbon repeat unit is chlorotrifluoroethylene and said hydrocarbon repeat unit is vinyl acetate.

5. The linear copolymer according to claim 4 having a composition in a range from about 16 mol % to about 51 mol % chlorotrifluoroethylene.

6. The linear copolymer according to claim 1 wherein said fluorocarbon repeat unit is vinylidene fluoride and said hydrocarbon repeat unit is vinyl acetate.

7. The linear copolymer according to claim 1 wherein said fluorocarbon repeat unit is tetrafluoroethylene and said hydrocarbon repeat unit is acrylic acid.

8. The linear copolymer according to claim 1 wherein said fluorocarbon repeat unit is tetrafluoroethylene and said hydrocarbon repeat unit is tertiary butyl acrylate.

9. The linear copolymer according to claim 1 wherein said fluorocarbon repeat unit is tetrafluoroethylene and said hydrocarbon repeat unit is ethyl acrylate.

10. The linear copolymer according to claim 1 wherein said fluorocarbon repeat unit is tetrafluoroethylene and said hydrocarbon repeat unit is vinyl alcohol.

11. The linear copolymer according to claim 10 having a composition in a range from about 7 mol % to about 71 mol % tetrafluoroethylene.

12. The linear copolymer according to claim 1 wherein said fluorocarbon repeat unit is chlorotrifluoroethylene and said hydrocarbon repeat unit is vinyl alcohol.

13. The linear copolymer according to claim 12 having a composition in a range from about 16 mol % to about 51 mol % chlorotrifluoroethylene.

14. The linear copolymer according to claim 1 wherein said fluorocarbon repeat unit is vinylidine fluoride and said hydrocarbon repeat unit is vinyl alcohol.

15. A linear terpolymer comprising tetrafluoroethylene, vinyl alcohol and vinyl acetate repeat units.

16. A linear terpolymer comprising chlorotrifluoroethylene, vinyl alcohol and vinyl acetate repeat units.

17. A linear terpolymer comprising vinylidine fluoride, vinyl alcohol and vinyl acetate repeat units.

18. A linear terpolymer comprising tetrafluoroethylene, isopropyl acrylate and acrylic acid repeat units.

19. A linear terpolymer comprising tetrafluoroethylene, isopropyl acrylate and ethyl acrylate repeat units.

20. A linear copolymer comprising fluorocarbon monomers and hydrocarbon monomers, said fluorocarbon monomers having a formula $CF_2=CR1R2$, wherein C is carbon, F is fluorine, R1 is one of hydrogen, halogen, alkyl, aryl, haloalkyl, alkoxy, haloalkoxy, haloaryl and wherein R2 is one of hydrogen and halogen, said hydrocarbon monomers having a formula $CH_2=CR3CO_2R4$, wherein R3 is one of hydrogen and an alkyl, and R4 is one of hydrogen, an alkyl group and a haloalkyl group.

21. The linear copolymer according to claim 20 wherein R4 is one of an alkyl group and a haloalkyl group transesterified to ester groups, $CO_2R5$, where R5 is a different group such as alkyl or haloalkyl.

22. The linear copolymer according to claim 20 wherein R4 is one of an alkyl group and a haloalkyl group that is hydrolyzed to carboxylic acid or salt.

23. A linear copolymer comprising fluorocarbon monomers and hydrocarbon monomers, fluorocarbon monomers having a formula, $CF_2=CR1R2$, wherein C is carbon, F is fluorine, R1 is selected from the group consisting of hydrogen, halogen, alkyl, aryl, haloalkyl, alkoxy, haloalkoxy, haloaryl and R2 is selected from the group consisting of hydrogen, halogen, said hydrocarbon monomers having a formula, $CH2=CR3OC(O)R4$ wherein R3 is one of hydrogen and alkyl, and R4 is an alkyl group.

* * * * *